(12) United States Patent
Sellers

(10) Patent No.: US 9,498,706 B1
(45) Date of Patent: Nov. 22, 2016

(54) SYSTEM AND METHOD FOR PROVIDING AN ENHANCED RESEARCH GAME MECHANIC

(71) Applicant: KABAM, INC., San Francisco, CA (US)

(72) Inventor: Michael Sellers, Pacifica, CA (US)

(73) Assignee: KABAM, INC., San Francisco, CA (US)

( * ) Notice: Subject to any disclaimer, the term of this patent is extended or adjusted under 35 U.S.C. 154(b) by 37 days.

(21) Appl. No.: 13/783,120

(22) Filed: Mar. 1, 2013

(51) Int. Cl.
 A63F 13/10 (2006.01)
 A63F 13/40 (2014.01)

(52) U.S. Cl.
 CPC ................................. *A63F 13/10* (2013.01)

(58) Field of Classification Search
 CPC ....................................................... G07F 17/00
 USPC ................................................. 463/7, 31, 42
 See application file for complete search history.

(56) References Cited

U.S. PATENT DOCUMENTS

| | | | |
|---|---|---|---|
| 7,025,675 B2 | 4/2006 | Fogel et al. | 463/9 |
| 8,109,818 B2 | 2/2012 | Pottinger et al. | 463/9 |
| 8,425,330 B1 * | 4/2013 | Kislyi et al. | 463/42 |
| 8,540,566 B2 * | 9/2013 | Gregory-Brown et al. | 463/25 |
| 2003/0008696 A1 * | 1/2003 | Abecassis | A63F 13/10 463/9 |
| 2012/0289328 A1 * | 11/2012 | Harp | A63F 13/10 463/31 |
| 2013/0090173 A1 * | 4/2013 | Kislyi | 463/43 |

OTHER PUBLICATIONS

"World of Warcraft: Cataclysm" published before Mar. 1, 2013, accessible and printed from URL <http://en.wikipedia.org/wiki/World_of_Warcraft:_Cataclysm>, 8 pages.*
"WoW Archaeology Guide" published before Mar. 1, 2013, accessible and printed from URL <http://www.wow-professions.com/wowguides/wow-archaeology-guide.html>, 4 pages.*
"Technology Tree From Kerbal Space Program" accessible and printed from URL <http://wiki.kerbalspaceprogram.com/wiki/Technology_tree>, 15 pages.*
"Beginner's Guide to Archaeology" published before Mar. 1, 2013, accessible and printed from URL <http://wow.crafterstome.com/guide/archaeology.html>, 5 pages.*
"Chocobo Hot and Cold" published before Mar. 1, 2013, accessible and printed from URL <http://finalfantasy.wikia.com/wiki/Chocobo_Hot_and_Cold>, 10 pages.*

(Continued)

*Primary Examiner* — Jason Skaarup
(74) *Attorney, Agent, or Firm* — Sheppard Mullin Richter & Hampton LLP

(57) ABSTRACT

The disclosure relates to systems and methods for providing an enhanced research game mechanic that simulates research in a virtual simulation such as a game. The system may engage the user in the virtual discovery process and therefore provide the user with a more realistic sense of discovery. The game may include a research space having a plurality of spatially arranged positions. The discovery locations may be hidden from the user's view until discovered. To make a virtual discovery, a user may interact with the positions of a corresponding discovery location. For example, the user may select or otherwise indicate a position in the research space. The system may determine whether selected or indicated position corresponds to a position assigned to the discovery location. The user may interact with the position in other ways such as by positioning a research unit at a position of the research space.

19 Claims, 5 Drawing Sheets

(56) References Cited

OTHER PUBLICATIONS

"Archaeology" published before Mar. 1, 2013, accessible and printed from URL <http://www.wowwiki.com/Archaeology>, 5 pages.*

"Science (Civ5)" printed from and accessible via URL <http://civilization.wikia.com/wiki/Science_(Civ5)>, 4 pages.*

"Civilization V" published by Wikipedia, printed from and accessible via URL <https://web.archive.org/web/20111119092453/http://en.wikipedia.org/wiki/Civilization_V>, 10 pages.*

"Civilization V Game Manual" printed from and accessible via URL <http://www.replacementdocs.com/download.php?view.8533>, 233 pages.*

Archaeology—Skill—World of Warcraft; http://www.wowhead.com/skill=794/archaeology, printed Nov. 7, 2012, 4 pages.

"Master of Orion", fromWikipedia, the free encyclopedia, http://en.wikipedia.org/wiki/Master_of_Orion, printed Nov. 7, 2012, 1 page.

"Master of Orion/Technology tree", From StrategyWiki, the video game walkthrough and strategy guide wiki, http://strategywiki.org/wiki/Master_of_Orion/Technology_tree, printed Nov. 7, 2012, 2 pages.

* cited by examiner

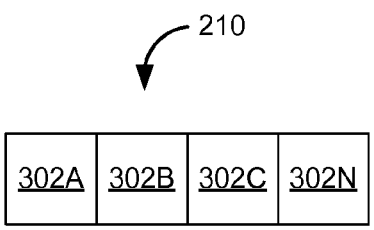
FIG. 3A
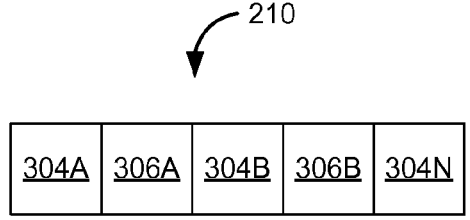
FIG. 3B
| 210A | 210B | 210B | 210B | 210A |
FIG. 3C
| 210A | 210A | 210A | 210A |
|------|------|------|------|
| 210A | 210B | 210B | 210A |
| 210A | 210A | 210A | 210A |
FIG. 3D

| RESEARCH UNIT | SKILL IN FINDING DISCOVERIES | SKILL IN PRODUCING DISCOVERIES |
|---|---|---|
| 402A | 1.0 | 1.2 |
| 402B | 0.9 | 0.8 |
| 402N | 0.7 | 1.1 |

# SYSTEM AND METHOD FOR PROVIDING AN ENHANCED RESEARCH GAME MECHANIC

FIELD OF THE INVENTION

The disclosure relates to systems and methods for providing an enhanced research game mechanic that simulates research in a virtual simulation such as a game.

BACKGROUND OF THE INVENTION

Video games and other applications that simulate research conventionally use technology trees with nodes that represent discoveries and edges between the nodes that allow one discovery to lead to another discovery. As a user progresses through the tree, other nodes may become available for discovery. For example, discovery of a first level of virtual technology in the game allows a user to "discover" a second level of virtual technology. However, such simulated research is deterministic and does not reflect real-world research, which typically involves trial-and-error, hypothesis testing, and, in some instances, a degree of luck. As such, conventional research simulations do not involve game play in a manner that simulates how real-world research and innovation takes place.

SUMMARY OF THE INVENTION

The disclosure relates to systems and methods for providing an enhanced research game mechanic that simulates research in a virtual simulation such as a game. The system may engage the user in the virtual discovery process and therefore provide the user with a more realistic sense of discovery. For example, the system may facilitate active participation by the user to make virtual discoveries in the game by receiving affirmative decisions from the user that may or may not result in a virtual discovery. In some embodiments, finding a discovery may be determined stochastically based on the user's method of searching, lending more to real-world discovery rather than deterministic node-edge graphs.

The game may include a research space having spatial relationships between virtual discoveries. Instead of conventional node-edge graphs, the spatial relationships may dictate when such virtual discoveries will become available to be made. The research space may include a plurality of positions. One or more of the positions may be assigned with a discovery location that corresponds to a virtual discovery. The discovery locations may be hidden from the user's view until discovered.

The positions of a given discovery location may be arranged to form various shapes or constellations that, when located, cause knowledge-based benefits such as a virtual technology to be made available to the user. The positions assigned a discovery location may overlap with other positions assigned to other discovery locations.

To make a virtual discovery, a user may interact with the positions of a corresponding discovery location. For example, the user may select or otherwise indicate a position in the research space. The system may determine whether the selected or indicated position corresponds to a position assigned to the discovery location. The user may interact with the position in other ways such as by positioning a research unit at a position of the research space. Research units may include a virtual researcher, virtual research equipment, virtual facilities, etc. Research units may be combined with other research units to enhance an ability to make virtual discoveries. For example, two or more virtual researchers may be combined and/or a virtual researcher may be combined with virtual equipment.

In some embodiments, research units may be specialized so that a particular type of research unit should be used to make a particular type of virtual discovery. For example, the probability of finding the discovery location may be determined stochastically, weighted by a skill of the research unit and/or other factors.

In some embodiments, research units may be transferred such as during an alliance, captured after winning a battle, and/or otherwise moved from one user to another user.

In some embodiments, the system may indicate discovery locations to provide the user with hints related to finding discovery locations. For example, the system may provide visual and/or other types of clues that indicate the general area in which a discovery location is disposed (e.g., a "glowing" effect or some other visual or other type of clue). For example, visual clues may become brighter and/or more location specific as research units are placed or other related discoveries are made to give the user an indication of how close they are to finding a discovery location. In some embodiments, such clues may be given only for virtual discoveries that are imminently makeable based on the user's current level of knowledge. In these embodiments, clues for discovery locations that are far advanced from the "current" technological level of a user may not be provided. Such discovery locations may be made available for virtual discovery but may not be apparent to the user. Attempts to discover such advanced virtual discoveries may be randomly made without assistance using clues.

In some embodiments, the system may provide indications of discovery locations based on a progress line. The discovery locations may be arranged in the research space such that discovery locations associated with less advanced virtual technology are positioned at the left side of the research space and discovery locations associated with more advanced virtual technology are positioned at the right side of the research space, assuming that the game progresses from left-to-right with respect to the research space over time. The progress line may move from left to right as discovery locations are uncovered, and as undiscovered discovery locations get closer to the progress line, the indication of such undiscovered locations may get brighter/more specific. In some embodiments, as the progress line crosses an undiscovered location, the location becomes discovered.

In some embodiments, the discovery locations may include primary discovery locations and secondary discovery locations. Primary discovery locations may correspond to foundational discoveries that may pave the way for other discoveries. For example, primary discovery locations may correspond to a class of virtual discovery such as gunpowder. Secondary discovery locations may correspond to implementation types of discoveries such as "corning" (making better, more stable gunpowder) and "rifling" (making guns that shoot more accurately). In some embodiments, secondary discovery locations are made findable when associated primary discovery locations have been found. For example, primary discovery locations may be arranged to form at least a partial boundary around secondary discovery locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. For example, "a user" may refer to one or more users.

BRIEF DESCRIPTION OF THE DRAWINGS

FIG. 3A illustrates an example of an arrangement of a discovery location having continuous positions, according to an embodiment of the invention.

FIG. 3B illustrates an example of an arrangement of a discovery location having discontinuous positions, according to an embodiment of the invention.

FIG. 3C illustrates an example of an arrangement of primary discovery locations and secondary discovery locations, according to an embodiment of the invention.

FIG. 3D illustrates an example of an arrangement of primary discovery locations forming a boundary around secondary discovery locations, according to an embodiment of the invention.

DETAILED DESCRIPTION OF THE INVENTION

The disclosure relates to systems and methods for providing an enhanced research game mechanic that simulates research in a game. The system may provide a gameplay experience for a game that includes a research component that simulates real-world research by integrating observation, testing, chance, and/or other characteristics of real-world research.

Figure 1:
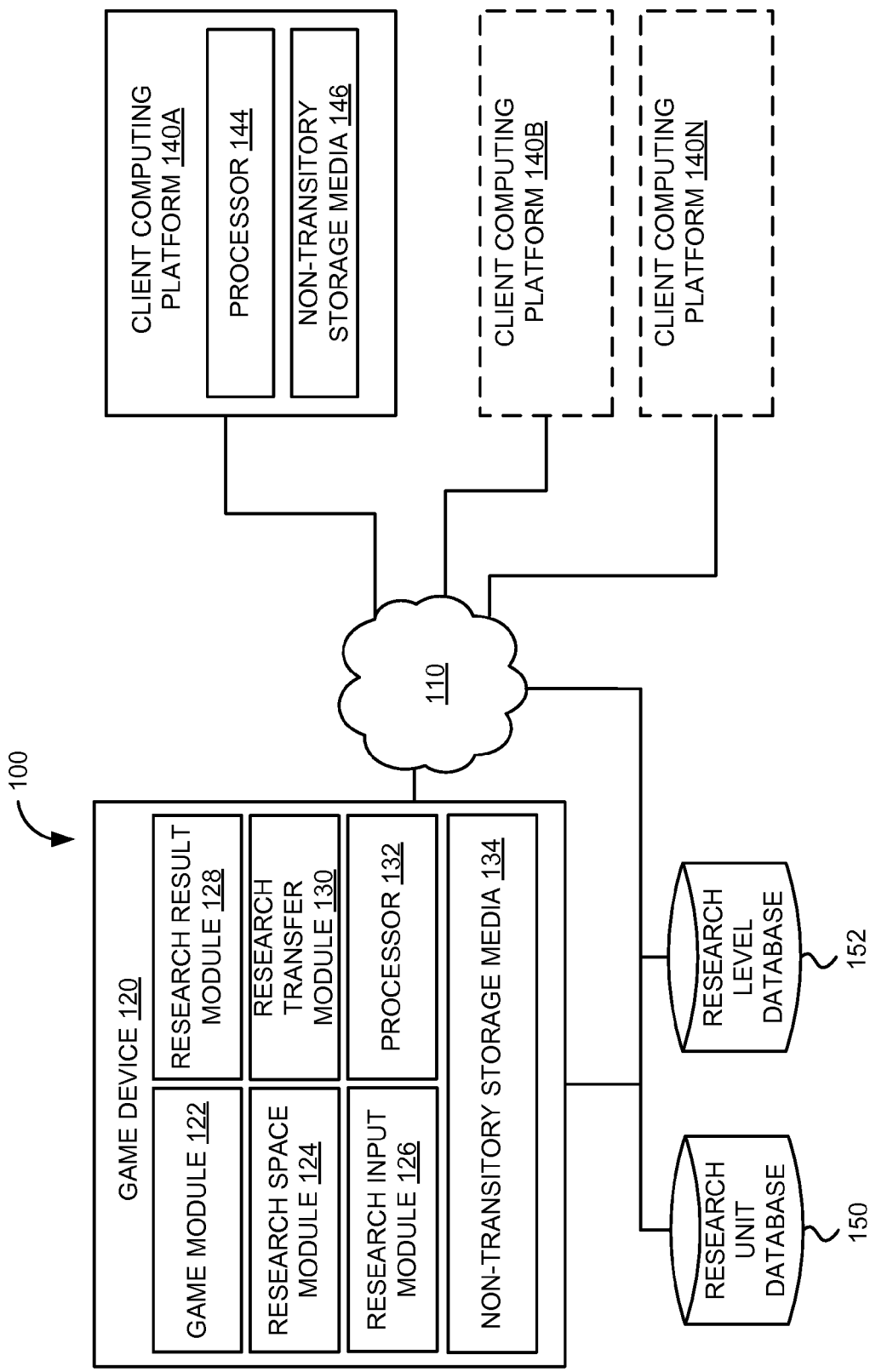
FIG. 1 illustrates a system configured to provide an enhanced research game mechanic that simulates discoveries in a game, according to an embodiment of the invention.

FIG. 1 illustrates a system 100 configured to provide an enhanced research game mechanic that simulates discoveries in a game, according to an embodiment of the invention. System 100 may include a game device 120, one or more client computing platforms 140 (illustrated as client computing platform 140A, 140B, . . . , 140N), and/or other components.

Game device 120 may include one or more processors 132 configured to execute one or more modules such as a game module 122, a research space module 124, a research input module 126, a research result module 128, a research transfer module 130, and/or other modules.

In some embodiments, game module 122 may be configured to facilitate gameplay of the game or other virtual environment. For example, game module 122 may be configured to provide logic for the game, define a virtual space in which the game is played, and/or provide other functions for facilitating gameplay. Game module 122 may facilitate gameplay according to various configurations such as, for example, a hosted gameplay configuration where one or more users may play the game online, a local gameplay configuration where one or more users may play the game locally (e.g., on a console device), a hybrid configuration where one or more users may play the game locally while connecting online with other users to play the online game, and/or other configurations.

Game module 122 may facilitate a research aspect of the game that simulates research activities for advancing virtual knowledge for use in the game. Virtual knowledge may include virtual technologies, virtual economic knowledge, virtual cultural knowledge, and/or other types of knowledge that can be simulated and advanced for use in the game. Thus, although described hereinafter in relation to virtual technologies, the features described herein are applicable to other types of virtual knowledge as well.

Game module 122 facilitates discovery and use of different classes and uses of virtual technologies. For example, a class of virtual technology may include virtual steam. Uses of the class of virtual technology may include a steam engine, which may lead to other sub-uses such as a virtual steamboat. One or more users or team of users may discover and use virtual technologies in the game. Furthermore, as described more fully below, one or more users or teams of users may steal from, acquire from, jointly discover with, and/or otherwise interact with other users or teams of users in relation to virtual technology. For a given user, an indication of different technology/research levels achieved or acquired, a time when discovery locations were found, a location where discovery locations were found, and/or other information related to research levels may be stored in research level database 152.

To facilitate discovery and use of virtual technology, game module 122 may make available one or more research units. Research units may include virtual researchers, virtual research facilities such as virtual buildings, equipment, etc., and/or other virtual units that can be used to discover virtual technologies. Research units may impose a cost for acquiring and/or using such research units. For example, game module 122 may receive a virtual or real currency and/or other resource (virtual or otherwise) to be used in exchange for obtaining research units. Different types of research units may each have their own characteristics, which may be stored in research unit database 150.

Figures 4A, 4B:
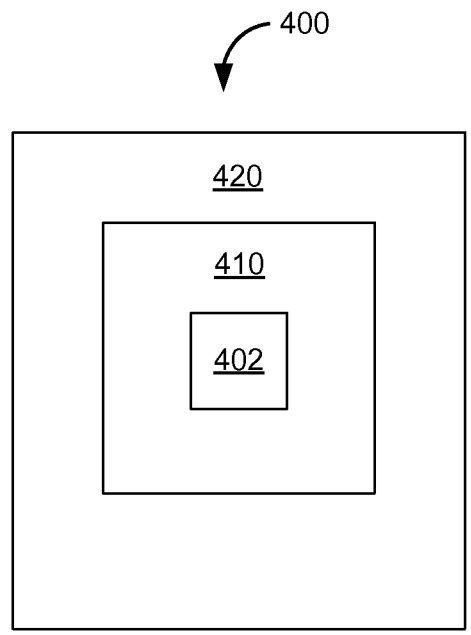
FIG. 4A illustrates an example of the discovery capability of a research unit in finding discovery locations, according to an embodiment of the invention.
FIG. 4B illustrates an example of the discovery capability of a research unit in finding discovery locations, according to an embodiment of the invention.

Game module 122 may make available certain research units that are more effective at discovering virtual technologies than other research units (and therefore impose a higher cost than less effective research units). For example, a virtual researcher may be more skilled than another virtual researcher and therefore result in a greater ability to actually discover a virtual technology as described herein. Game module 122 may assign a skill level for a research unit. Examples of implementations of research unit skill levels are illustrated in FIGS. 4A and 4B. In some embodiments, research units have different specialties and combinations of research units may be used as well, as will be described in greater detail below. Various modules of computing device 120 may facilitate making a virtual discovery in the game.

In some embodiments, research space module 124 may be configured to define a research space for visual presentation to a user as part of an interface to the game. The research space may have two- and/or three-dimensional spatial dimensions and be divided into an array (e.g., plurality) of positions. Research space module 124 may assign a set of positions having at least two of the positions to a discovery location. Thus, a discovery location may be located at a set of positions of the research space.

A discovery location is associated with discovery of a virtual technology. For example, a first discovery location may be associated with a first virtual technology being usable in the game by the user. Likewise, a second discovery location may be associated with a second virtual technology being usable in the game.

A discovery location may be found when a user interacts with the set of positions such as when the user selects a position, indicates that a research unit is to conduct research at the position (such as by spatially moving the research unit to the position or otherwise indicating that the research unit should be associated with the position), and/or otherwise indicates a request to find a discovery location based on the user interaction. When found, the discovery location may be marked as such in the research space of the game for the user.

In some embodiments, whether the discovery location is found even when the user interacts with the sets of positions may be deterministic (always found) or probabilistic (sometimes found). For example, when deterministic and the user interacts with all of the positions of the set of positions, the discovery location will be found and the associated virtual technology made available to the user. On the other hand, when probabilistic and the user interacts with all of the positions of the set of positions, then the discovery location may be found 80% of the time. In some embodiments, when probabilistic, particular types of research units, numbers of research units, and/or combinations of types of research units may result enhance the probability of finding the discovery location.

Various numbers of positions and/or different configurations of the positions may be used. The sets of positions associated with a discovery location may be continuous (e.g., no intervening spaces between the positions), discontinuous (e.g., having one or more intervening positions that are not related to the discovery location), or portions of set of positions being continuous while other portions are discontinuous. Furthermore, one discovery location may overlap with another discovery location. This may occur when two classes of virtual technologies are related to one another, when particular uses of a virtual technology are related, and so forth. In these instances, finding a position in the research space associated with two or more discovery locations at least partially finds the two or more discovery locations.

In some embodiments, sets of positions may be randomly assigned to a discovery location in the research space. In these embodiments, the position of a discovery location that is associated with a particular virtual technology may change when a game is replayed. Likewise, a first user may find a discovery location associated with the particular virtual technology at a first set of positions while a second user may find the discovery location at a second set of positions. In some embodiments, a discovery location may be predefined such that the discovery location does not change from a first game instance to a second game instance or from one user to another user. In some embodiments, some discovery locations may be random while other discovery locations are predefined.

In some embodiments, research space module 124 may define different types of discovery locations such as primary and secondary discovery locations. A primary discovery location may be associated with a class of virtual technology while a secondary discovery location may be associated with a particular use or specific type of virtual technology. For example, a primary discovery location may be associated with the discovery of virtual steam while a secondary discovery location may be associated with a virtual steam engine.

In some embodiments, research space module 124 may be configured such that a secondary discovery location is findable after a corresponding primary discovery location is found. For example, the secondary discovery location may not be discoverable until the primary discovery location is found. In some of these embodiments, research space module 124 may arrange two or more primary discovery locations around one or more secondary discovery locations. In some embodiments, the one or more primary discovery locations may be arranged to form a boundary around the one or more secondary discovery locations such that the primary discovery locations must be discovered before the one or more secondary discovery locations.

In some embodiments, research space module 124 may be configured to provide an indication of a discovery location. The indication may include, for example, a visual and/or other type of indication that indicates one or more of the positions associated with the discovery location. In some embodiments, the indication may or may not be coincident with one or more of the positions associated with a discovery location. For example, research space module 124 may cause one or more of the positions associated with a discovery location to be visually indicated such that the user may be informed that the indicated position is part of a discovery location. In another example, research space module 124 may cause a position not part of but nearby (e.g., within the same display screen) a position of the discovery location to be indicated such that the user may be informed that the discovery location is nearby. In some embodiments, research space module 124 may provide other types of indications as well, such as a visual, audible or haptic indication when, for example, the user is traversing an area that includes a discovery location.

In some embodiments, the indication may be presented as a text or clue that indicates a discovery location. The text or clue may include a custom message and/or a generic message. For example, the indication may include a custom message that a discovery location is at a location where the user traversed within a current or prior game session or instance. The indication may also include a generic message such as a message that indicates a discovery location being positioned nearby a landmark of the virtual space.

In some embodiments, the indication may be presented differently based on the type of discovery location being indicated. For example, a first class or use of a first virtual technology may be indicated as a first color, sound, effect, etc., while a second class or use of a second virtual technology may be indicated as a second color, sound, effect, etc. In some embodiments, the indication may change as the user interactions get closer to or further from the discovery location. For example, the indication may change as a research unit is positioned closer to the discovery location.

As previously described, a user may find discovery locations by interacting with a position assigned to the discovery location. In some embodiments, research input module 126 may be configured to receive research requests from the user that indicates such interaction. The research request may include a specified position in the array of positions assigned to the discovery location. For example, the user may click on or otherwise select the specified position to indicate that a research request is being made for that position.

In some embodiments, research input module 126 may be configured to receive an identification of one or more research units to be used in association with the specified position. In a particular example, research input module 126 may receive an indication that a research unit is being spatially positioned onto (e.g., dragged and dropped or otherwise commanded to go to) the position.

In some embodiments, research result module 128 may be configured to determine whether the specified position corresponds to one of the discovery locations. Responsive to the specified position not corresponding to one of the discovery locations, research result module 128 may not provide a resulting correspondence to the user. On the other hand, responsive to the specified position corresponding to a discovery location, research result module may provide access to the virtual technology in the game associated with the discovery location.

In some embodiments, research result module 128 may take into account the characteristics, numbers, combinations, and/or other information related to research units. In some embodiments, for example, a skilled virtual researcher may result in a greater number of discoveries and may do so faster and/or with less use of resources than a less-skilled researcher. For example, a first virtual researcher may yield a first level of technological discovery than a second level of technological discovery of a second virtual researcher.

In some embodiments, research units may be specialized for a particular type of research. For example, a research unit specializing in discovery of one type of virtual technology may be ineffective at discovering another type of virtual technology. Accordingly, in these embodiments, research result module 128 may require particular types of research units to discover corresponding types of virtual technologies.

In some embodiments, research units may become fatigued over time. For example, repeated use of a virtual researcher may degrade performance of the virtual researcher. As such, research result module 128 may enforce a rule such that research units when repeatedly used may experience a loss of skill level or otherwise lose effectiveness at making virtual discoveries. For example, a probability of making the discovery may be diminished and/or the resulting level of technological discovery may be diminished as the virtual researcher becomes fatigued (e.g., used greater than a predefined number of times for a given time period).

In some embodiments, two research units may be combined with similar types and/or different types of other research units to together achieve greater abilities at making virtual discoveries. For example, two virtual researchers may be more effective than a single virtual researcher at making a virtual discovery. A virtual researcher combined with another type of research unit, such as research equipment, may be more effective than the virtual researcher alone. For example, the combination may yield a greater level of virtual technological knowledge when a corresponding virtual location is found and/or may increase the probability of finding the virtual location (e.g., in implementations where finding the virtual location is probabilistic).

Research result module 128 may enforce rules such that various numbers and/or combinations of research units may be necessary to make a virtual discovery or are more effective at making such virtual discovery. In some instances, research result module 128 may enforce rules such that a number and/or combination of research units experience diminishing return on gains. For example, three research units may be more effective than one research unit whereas fifty research units tasked to make a virtual discovery may not be more effective than forty-five research units tasked to make the same virtual discovery.

In some embodiments, research result module 128 may enforce rules such that allies or users who otherwise agree to jointly develop technology are awarded at least a portion of virtual technology for use in the game when the corresponding virtual location is found by any one or more members of the alliance.

In some embodiments, research transfer module 130 may be configured to transfer virtual technology from a user to a different user. When the virtual technology is transferred from a first user to a second user, for example, the corresponding discovery location may be indicated as found on the second user's research space.

A user may agree to transfer certain virtual technology to another user under an agreement. In some embodiments, a user may conquer another user such as by capturing an enemy base, city, etc., and accordingly capture technological knowledge of the enemy, thereby causing a transfer of virtual technology. Other ways to transfer virtual technology may be used as well.

In some embodiments, research transfer module 130 may be configured to transfer research units such as virtual researchers. Like the transfer of virtual technology, such transfers may be agreed to willingly between users or forced (e.g., in a defeat). In some embodiments, upon transfer, the skill/effectiveness of the transferred research units may be enhanced, stay the same or decreased. Such determination may be random and/or may be based on rules that take into account the circumstances of the transfer (e.g., whether the transfer was amicable, the nature of the battle leading to the defeat, etc.).

In some embodiments, users may interact with the game using client computing platforms 140, which may include one or more processors 144 configured to execute one or more instructions that facilitate gameplay. Client computing platform 140 may communicate with game device 120 via network 110. Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The databases 150 and 152 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Those having skill in the art will recognize that game device 120 and client computing platform may each comprise one or more processors (132, 144), one or more interfaces (to various peripheral devices or components), non-transitory storage media (134, 146), and/or other components coupled via a bus. The non-transitory storage media may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

Figure 2:
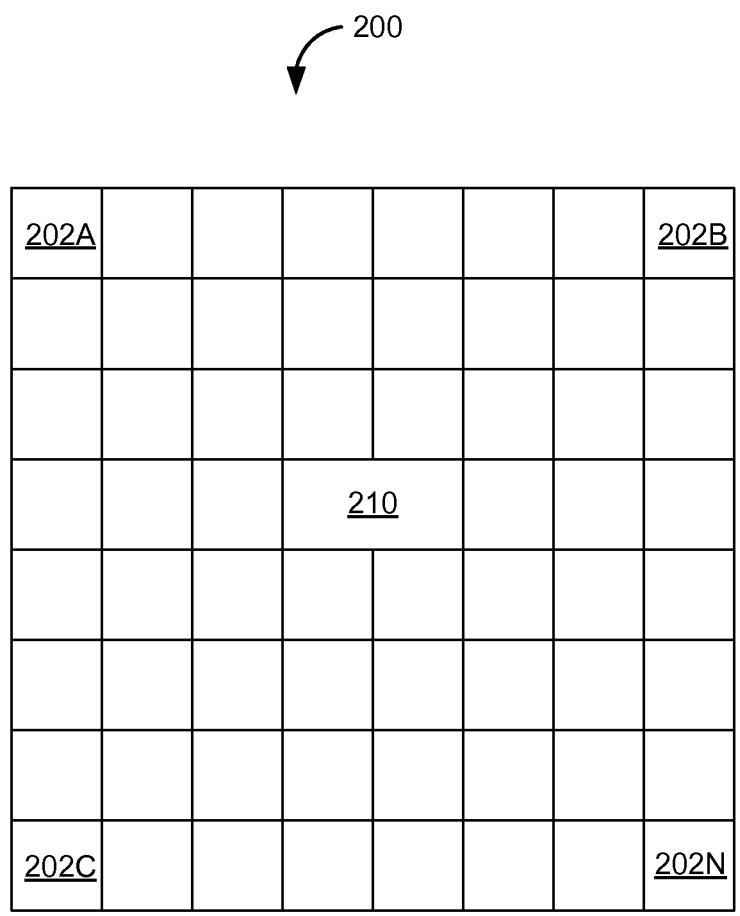
FIG. 2 illustrates an example of an arrangement of a research space that includes a discovery location, according to an embodiment of the invention.

FIG. 2 illustrates an example of an arrangement of a research space 200 that includes a discovery location 210, according to an embodiment of the invention. The research space illustrated in FIG. 2 and other drawing figures are for illustrative purposes only. Various components may be added, deleted, moved, or otherwise changed so that the configuration, appearance, and/or content of the virtual spaces may be different than as illustrated in the figures. Accordingly, the virtual spaces as illustrated (and described in greater detail below) are exemplary by nature and, as such, should not be viewed as limiting.

Although illustrated as a two-dimensional grid, research space 200 may include positions configured in other representations such as a three-dimensional grid or other position/coordinate representation. In some embodiments, research space 200 may correspond with a virtual space (not illustrated) that includes an interface through which a user plays the game.

Research space 200 may include a plurality of positions 202 (illustrated in FIG. 2 as positions 202A, 202B, 202C, . . . , 202N). Only four positions 202 are illustrated for convenience. Research space 200 may include one or more discovery locations 210. A discovery location 210 may occupy one or more positions 202. In some embodiments, discovery location 210 occupies two or more positions 202 such that a user is given access to a technology associated with the discovery location when each of the two or more positions 202 are found by the user. Discovery location 210 may have various arrangements of positions, examples of which are illustrated below.

FIG. 3A illustrates an example of an arrangement of a discovery location 210 having continuous positions, according to an embodiment of the invention. Continuous positions 302 (illustrated in FIG. 3A as continuous positions 302A, 302B, 302C, . . . , 302N) may be continuous in that the continuous positions 302 assigned to a discovery location 210 are adjacent to one another with no intervening positions. Although illustrated as a single row of continuous positions 302, discovery location 210 may include any arrangement of continuous positions 302 such that there are no intervening positions between any two continuous positions 302.

FIG. 3B illustrates an example of an arrangement of a discovery location 210 having discontinuous positions, according to an embodiment of the invention. Discontinuous positions 304 (illustrated in FIG. 3B as discontinuous positions 304A, 304B, . . . , 304N) may include positions where at least two of the discontinuous positions 304 are intervened by at least one non-discovery location position 306 (illustrated in FIG. 3B as positions 306A, 306B). Although illustrated as a single row of discontinuous positions 304, discovery location 210 may include any arrangement of discontinuous positions 304 such that there is at least one intervening position between at least two discontinuous positions 304.

FIG. 3C illustrates an example of an arrangement of primary discovery locations 210A and secondary discovery locations 210B, according to an embodiment of the invention. In some embodiments, primary discovery locations 210A may be required to be found before secondary discovery locations 210B are findable. For example, research result module 128 may not be responsive to research requests that specify positions corresponding to secondary discovery locations 210B unless associated discovery locations 210A are found.

FIG. 3D illustrates an example of an arrangement of primary discovery locations 210A forming a boundary around secondary discovery locations 210B, according to an embodiment of the invention.

The arrangements of the primary discovery locations 210A and secondary discovery location 210B illustrated in FIGS. 3C and 3D are not limiting, as the primary and secondary discovery locations may have different arrangements. In some embodiments, for example, the primary and secondary discovery locations 210A, 210B need not be continuous. Primary discovery locations 210A and secondary discovery locations 210B may be separated by one or more positions of the research space, enabling different configurations for the primary and secondary discovery locations. Furthermore, as described above, the primary and secondary discovery locations may each be comprised of one or more positions, examples of which were illustrated in FIGS. 3A and 3B.

FIG. 4A illustrates an example of the discovery capability of a research unit 402 in finding discovery locations, according to an embodiment of the invention. Research unit 402 when positioned onto the research space may make virtual discoveries when the position corresponds to a position of a discovery location. In some embodiments, research unit 402 may be associated with a particular skill or ability to find discovery locations. As illustrated in FIG. 4A, research unit 402 may include different ranges 410, 420 in which the research unit is able to find discovery locations.

For example, when a position assigned to a discovery location is within range 410, that position may be deemed to be found. In some embodiments, the different ranges 410, 420 may be associated with different probabilities of finding a position. For example, when a position assigned to a discovery location is within range 410, that position may be found 100% of the time. However, when a position assigned to a discovery location is within range 420, that position may be found only 80% of the time. Different research units 402 may have different ranges 410, 420 (or other number of ranges), reflecting their differences in skill.

FIG. 4B illustrates an example of the discovery capability of a research units 402 in finding discovery locations, according to an embodiment of the invention. In some embodiments, as illustrated in FIG. 4B, different research units 402 (illustrated in FIG. 4B as research units 402A, 402B, . . . , 402N) may be associated with different skills related to discovery locations. Thus, some research units may be more effective at virtual discovery than other research units. Although not illustrated in FIG. 4B, a research unit 402 may have different skills for different types of technology/areas of research.

As illustrated in FIG. 4B, a skill may include a skill at finding discoveries (such as a probability of finding a position assigned to a research location) and a skill in producing discoveries (such as a multiplier of the level of technology achieved after discovery). For example, research unit 402A may be associated with a 100% probability of finding a position assigned to a discovery location when research unit 402A is placed at the position. Research unit 402A may have a multiplier of 1.2 such that the resulting level of technological discovery is 1.2× a baseline level.

Research units 402B and 402N may be individually associated with their own respective probability of finding a position assigned to a discovery location and multiplier.

Figure 5:
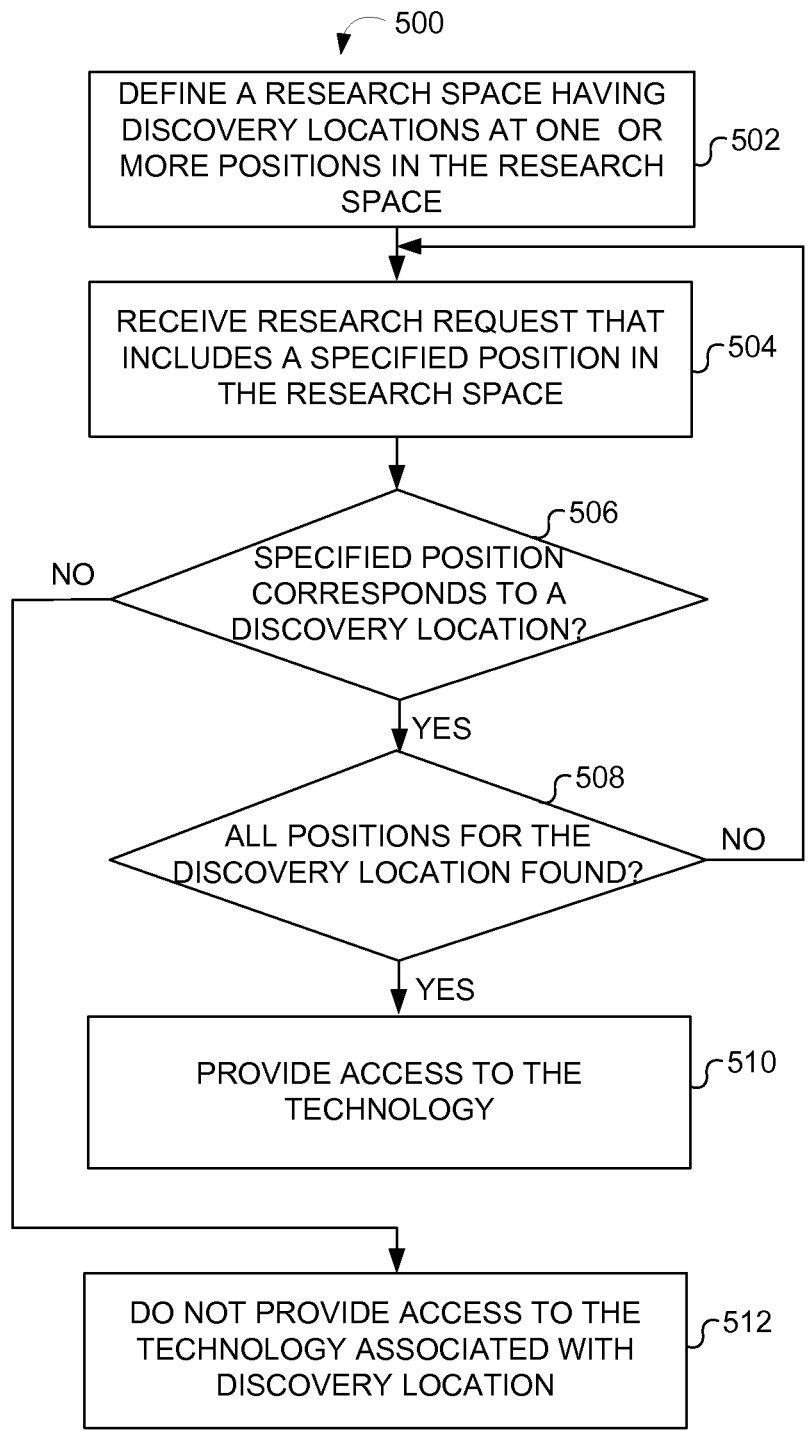
FIG. 5 illustrates a process of providing an enhanced research game mechanic that simulates discoveries in a game, according to an embodiment of the invention.

FIG. 5 illustrates a process 500 of providing an enhanced research game mechanic in an expression of a game, according to an embodiment of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, a research space for visual presentation to a user as part of an interface to a game may be defined. The research space may include spatially arranged positions, at least some of which are assigned to a discovery location. In an operation 504, research requests from the user may be received. A research request from the user may include a specified position.

In an operation 506, a determination of whether the specified position corresponds to a position assigned to the discovery location may be made. If the specified position does not correspond to a position assigned to the discovery location, access to the technology is not provided. On the other hand, if the specified position corresponds to a position assigned to the discovery location, a determination of whether all of the positions assigned to the discovery location have been found may be made in an operation 508. If all of the positions of the discovery location have not been found, processing may return to operation 504. If all of the positions of the discovery location have been found, then access to the technology may be provided in an operation 510.

Although described with respect to video games, the disclosure may be used in other contexts in which a virtual space may be expressed at a client computing platform and virtual discovery takes place. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A game system comprising:
one or more processors configured by machine-readable instructions to:
define a research space for visual presentation to users on client computing platforms associated with the users as part of an interface to a game, the research space having spatial dimensions and being divided into an array of positions, with two or more of the positions being assigned as discovery locations, with the individual discovery locations being associated with different virtual technologies, the virtual technologies being virtual knowledge in the game that provide abilities to the users in the game, the individual discovery locations including a first discovery location associated with a first technology;
receive research requests from the client computing platforms associated with the users, the research requests including: a first research request received from a first client computing platform associated with a first user including a first specified position in the array of positions to which a first research unit is deployed, a second research request received from a second client computing platform associated with a second user including a second specified position in the array of positions to which a second research unit is deployed, and a third research request received from a third client computing platform associated with a third user including a third specified position in the array of positions to which a third research unit is deployed, wherein the first research unit has a first skill or experience level associated with a first distance range, the second research unit has a second skill or experience level associated with a second distance range, and the third research unit has a third skill or experience level associated with a third distance range;
determine, responsive to receiving the research requests, whether the first specified position, the second specified position, and/or the third specified position correspond to one of the discovery locations and/or are within associated distance ranges of the of one of the discovery locations, such that responsive to the second specified position and the third specified position being the same specified position in the array of positions, (i) the first specified position to which the first research unit is deployed is determined to correspond with the first discovery location by virtue of the first specified position corresponding to the first discovery location, (ii) the second specified position to which the second research unit is deployed is determined to correspond with the first discovery location by virtue of the second specified position being within the second distance range from the first discovery location, and (iii) the third specified position to which the third research unit is deployed is determined not to correspond with the first discovery location by virtue of the third specified position not being within the third distance range from the first discovery location; and
cause the third client computing platform associated with the third user to communicate the lack of correspondence to the third user, and cause the first client computing platform associated with the first user and the second client computing platform associated with the second user to provide the first user and the second user access to the first technology in the game.

2. The game system of claim 1, wherein the one or more processors are further configured by machine-readable instructions such that resources in the game are required to make the research requests.

3. The game system of claim 1, wherein the one or more processors are further configured by machine-readable instructions to define a virtual space in which the game is played.

4. The game system of claim 1, wherein the discovery locations include sets of discovery locations including a first set of discovery locations that includes two or more primary discovery locations and two or more secondary discovery locations.

5. The game system of claim 4, wherein the two or more primary discovery locations are arranged to form a boundary around the two or more secondary discovery locations such that the two or more secondary discovery locations are not discoverable until the two or more primary locations have been discovered.

6. The game system of claim 4, wherein the two or more primary discovery locations are arranged to form a boundary around the two or more secondary discovery locations, and visual cues related to the positions of the two or more secondary discovery locations are provided in the research space.

7. The game system of claim 1, wherein a skill or experience level comprises a probability of finding a position of the first discovery location, and wherein the provided access to the first technology in the game for the first user responsive to the first specified position corresponding to the first discovery location is based on the probability such that even when the first specified position corresponds to the first discovery location, provision of access to the first knowledge technology for the first user is subject to the probability.

8. The game system of claim 1, wherein the technologies enable one or more of building advanced units, building advanced buildings, and/or increasing resource gathering.

9. A computer-implemented method, the method being implemented in a computer that includes one or more physical computer processors configured by machine-readable instructions, the method comprising:

defining, by the one or more physical computer processors, a research space for visual presentation to users on client computing platforms associated with the users as part of an interface to a game, the research space having spatial dimensions and being divided into an array of positions, with two or more of the positions being assigned as discovery locations, with the individual discovery locations being associated with different virtual technologies, the technologies being virtual knowledge in the game that provide the users with abilities in the game, the individual discovery locations including a first discovery location associated with a first technology;

receiving, at the one or more physical computer processors, research requests from the client computing platform associated with the users, the research requests including: a first research request received from a first client computing platform associated with a first user including a first specified position in the array of positions to which a first research unit is deployed, a second research request received from a second client computing platform associated with a second user including a second specified position in the array of positions to which a second research unit is deployed, and a third research request received from a third client computing platform associated with a third user including a third specified position in the array of positions to which a third research unit is deployed, wherein the first research unit has a first skill or experience level associated with a first distance range, the second research unit has a second skill or experience level associated with a second distance range, and the third research unit has a third skill or experience level associated with a third distance range;

determining, by the one or more physical computer processors, responsive to receiving the research requests, whether the first specified position, the second specified position, and/or the third specified position correspond to one of the discovery locations and/or are within associated distance ranges of the of one of the discovery locations, such that responsive to the second specified position and the third specified position being the same specified position in the array of positions, (i) the first specified position to which the first research unit is deployed is determined to correspond with the first discovery location by virtue of the first specified position corresponding to the first discovery location, (ii) the second specified position to which the second research unit is deployed is determined to correspond with the first discovery location by virtue of the second specified position being within the second distance range from the first discovery location, and (iii) the third specified position to which the third research unit is deployed is determined not to correspond with the first discovery location by virtue of the third specified position not being within the third distance range from the first discovery location; and causing the third client computing platform associated with the third user to communicate the lack of correspondence to the third user, and causing the first client computing platform associated with the first user and the second client computing platform associated with the second user to provide the first user and the second user access to the first technology in the game.

10. The computer-implemented method of claim 9, wherein resources in the game are required to make the research requests.

11. The computer-implemented method of claim 9, the method comprising:

defining, by the one or more physical computer processors, a virtual space in which the game is played.

12. The computer-implemented method of claim 9, wherein the discovery locations include sets of discovery locations including a first set of discovery locations that includes two or more primary discovery locations and two or more secondary discovery locations.

13. The computer-implemented method of claim 12, wherein the two or more primary discovery locations are arranged to form a boundary around the two or more secondary discovery locations such that the two or more secondary discovery locations are not discoverable until the two or more primary locations have been discovered.

14. The computer-implemented method of claim 9, wherein the two or more primary discovery locations are arranged to form a boundary around the two or more secondary discovery locations, and visual cues related to the positions of the two or more secondary discovery locations are provided in the research space.

15. The computer-implemented method of claim 9, wherein a skill or experience level comprises a probability of finding a position of the first discovery location, and wherein the provided access to the first technology in the game for the first user responsive to the first specified position corresponding to the first discovery location is based on the probability such that even when the first specified position corresponds to the first discovery location, provision of access to the first knowledge technology for the first user is subject to the probability.

16. The method of claim 9, wherein the technologies enable one or more of building advanced units, building advanced buildings, and/or increasing resource gathering.

17. A non-transitory storage medium, the non-transitory storage medium storing one or more instructions that when executed by one or more processors configure the one or more processors to:

define a research space for visual presentation to users on client computing platforms associated with the users as part of an interface to a game, the research space having spatial dimensions and being divided into an array of positions, with two or more of the positions being assigned as discovery locations, with the individual discovery locations being associated with different virtual technologies, the virtual technologies being virtual knowledge in the game that provide abilities to the users in the game, the individual discovery locations including a first discovery location associated with a first technology;

receive research requests from the users, the research requests including: a first research request received from a first client computing platform associated with a first user including a first specified position in the array of positions to which a first research unit is deployed, a second research request received from a second client computing platform associated with a second user including a second specified position in the array of positions to which a second research unit is deployed, and a third research request received from a third client computing platform associated with a third user including a third specified position in the array of positions to which a third research unit is deployed, wherein the first research unit has a first skill or experience level associated with a first distance range, the second research unit has a second skill or experience level associated with a second distance range, and the third research unit has a third skill or experience level associated with a third distance range; and determine, responsive to receiving the research requests, whether the first specified position, the second specified position, and/or the third specified position correspond to one of the discovery locations and/or are within associated distance ranges of the of one of the discovery locations, such that responsive to the second specified position and the third specified position being the same specified position in the array of positions, (i) the first specified position to which the first research unit is deployed is determined to correspond with the first discovery location by virtue of the first specified position corresponding to the first discovery location, (ii) the second specified position to which the second research unit is deployed is determined to correspond with the first discovery location by virtue of the second specified position being within the second distance range from the first discovery location, and (iii) the third specified position to which the third research unit is deployed is determined not to correspond with the first discovery location by virtue of the third specified position not being within the third distance range from the first discovery location; and cause the third client computing platform associated with the third user to communicate the lack of correspondence to the third user, and cause the first client computing platform associated with the first user and the second client computing platform associated with the second user to provide the first user and the second user access to the first technology in the game.

18. The non-transitory storage medium of claim 17, wherein the discovery locations include sets of discovery locations including a first set of discovery locations that includes two or more primary discovery locations and two or more secondary discovery locations, and wherein the two or more primary discovery locations are arranged to form a boundary around the two or more secondary discovery locations such that the two or more secondary discovery locations are not discoverable until the two or more primary locations have been discovered.

19. The non-transitory storage medium of claim 17, wherein the technologies enable one or more of building advanced units, building advanced buildings, and/or increasing resource gathering.

* * * * *